E. C. PRICE.
HOUSEHOLD UTENSIL.
APPLICATION FILED JUNE 11, 1908.
928,537.
Patented July 20, 1909.
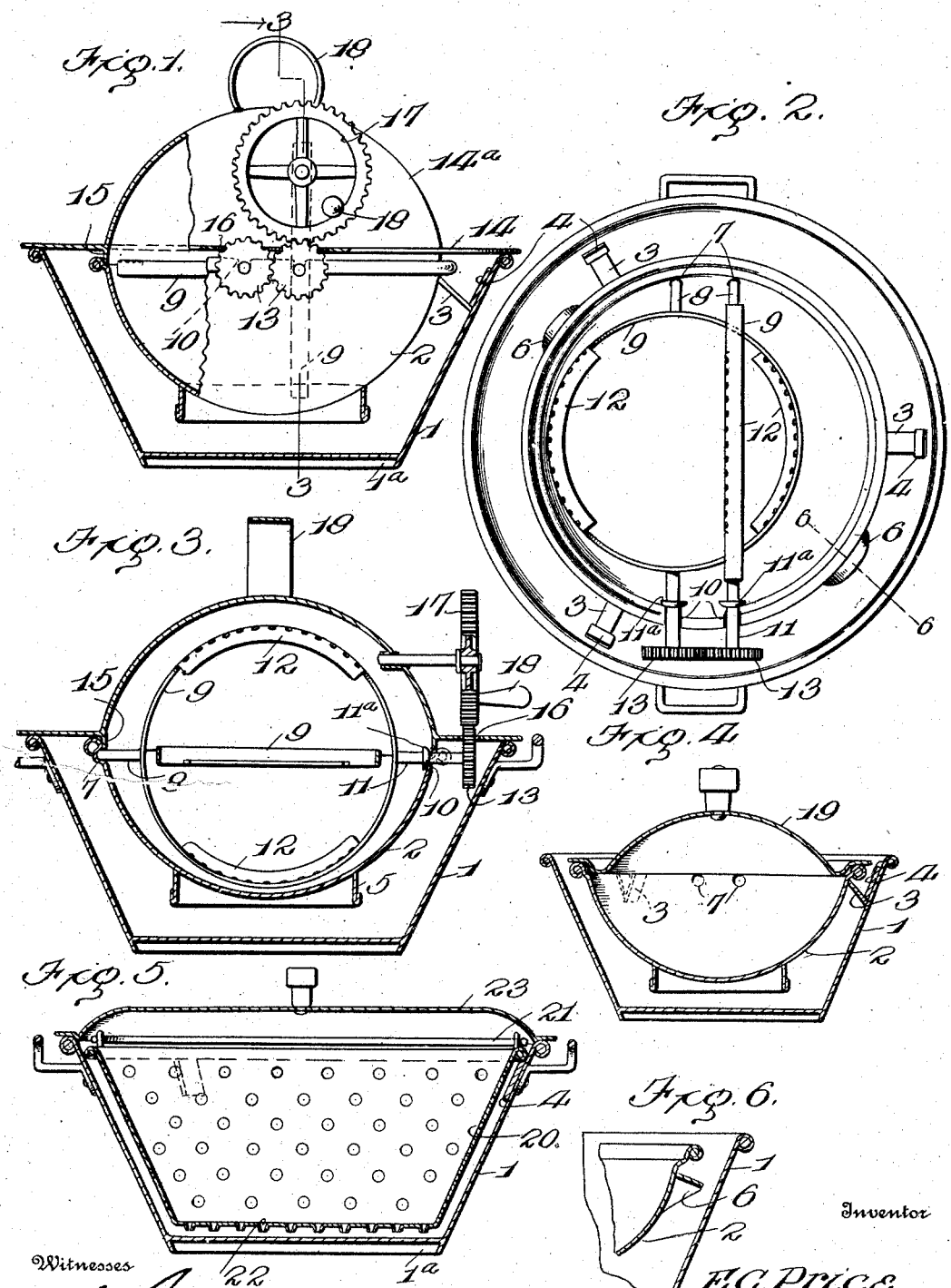
Inventor
E. C. Price

UNITED STATES PATENT OFFICE.

EUGENE C. PRICE, OF GULFPORT, MISSISSIPPI.

HOUSEHOLD UTENSIL.

No. 928,537.      Specification of Letters Patent.      Patented July 20, 1909.

Application filed June 11, 1908. Serial No. 437,957.

*To all whom it may concern:*

Be it known that I, EUGENE C. PRICE, a citizen of the United States, residing at Gulfport, in the county of Harrison and State of Mississippi, have invented certain new and useful Improvements in Household Utensils, of which the following is a specification.

The present invention relates to a novel household utensil which embodies a novel construction whereby it has an extensive range of usefulness and may be utilized for a large variety of culinary operations.

The object of the invention is the provision of a utensil of this character which is simple and inexpensive in its construction and in which the various parts can be readily combined or assembled in the various manners as required.

For a full understanding of the invention and the merits thereof and also to acquire a knowledge of the details of construction and the means for effecting the result, reference is to be had to the following description and accompanying drawings, in which:

Figure 1 is a side elevation of a household utensil embodying the invention, portions being broken away and shown in section. Fig. 2 is a top plan view of the same with the cover removed. Fig. 3 is a vertical sectional view through the device. Fig. 4 is a similar view on a reduced scale showing the dashers removed from the inner vessel and the smaller cover applied thereto. Fig. 5 is a sectional view through the outer receptacle showing the perforated shell as mounted therein. Fig. 6 is a detail view of a portion of the outer receptacle and the inner vessel and shows one of the handles upon the latter.

Corresponding and like parts are referred to in the following description and indicated in all the views of the drawings by the same reference characters.

Referring to the drawing, the numeral 1 designates the outer receptacle which may be formed of tin or other suitable material and is preferably flared upwardly as shown. The bottom of the outer receptacle is preferably of such a size as to be received within an opening in the top of a stove and is formed with a downwardly projecting annular flange 1ª upon which the receptacle is supported when placed upon a plane surface. The inner vessel 2 is designed to be employed in connection with the outer receptacle 1 when it is desired to carry on certain operations, and this inner vessel is smaller than the outer receptacle and is supported within the latter so as to be spaced therefrom. As shown in the drawing the inner vessel 2 has a substantially semispherical formation and is provided with the arms 3 which project outwardly from the sides thereof. These arms 3 are inclined downwardly and outwardly and serve to engage the flared sides of the outer receptacle 1 to support the inner vessel and prevent downward movement thereof. It is also contemplated to provide means for locking the inner vessel against upward movement and for this purpose the sides of the outer receptacle 1 are provided with the inward projections 4 under which the extremities of the arms 3 are turned after the inner vessel has been placed in position. It will thus be obvious that the flared sides of the outer receptacle prevent any downward movement of the arms 3 while the projections 4 serve to prevent any upward movement of the said arms. The inner vessel is thereby held securely against accidental displacement, but can be readily lifted out of position by previously turning the arms 3 out of engagement with the projections 4. The exterior of the inner vessel is provided at the bottom with an annular flange 5 which supports the vessel when rested upon a plane surface, and also at the sides with the handles 6.

A pair of spaced bearings 7 are formed at the mouth of the inner vessel 2 upon one side thereof and receive the studs 8 upon the dashers 9. The opposite side of the inner vessel is provided with notches 10 loosely receiving stub shafts 11 which also project from the dashers 9 and are arranged in alinement with the pivot studs 8. These dashers 9 are preferably in the nature of rings of a slightly smaller diameter than the vessel and the rings are provided at their outer swinging portions with the perforated flanges 12. The extremities of the stub shafts 11 project beyond the side of the inner vessel and terminate in the pinions 13 which mesh with each other so that when one of the pinions is turned the two dashers will be rotated in opposite directions. Each of the stub shafts 11 is formed with a collar 11ª which engages the interior of the inner vessel to prevent longitudinal movement of the dashers when mounted in operative position. It will thus be apparent that as long as the stub shafts rest within the notches 10 the pivot studs 8 will be held within the bearings 7, while by lifting the stub shafts from the notches the collars 11ª will be moved out of engagement with the vessel and the dashers can be moved to withdraw the pivot studs from the bearings. A cover 14 is removably applied to the outer receptacle 1, the central portion of the cover being bulged upwardly at 14ª and this bulged portion being substantially semispherical in shape and being designed to coöperate with the semispherical inner vessel 2 to form a spherical chamber within which the dashers 9 can operate. It will also be noted that the cover 14 is provided with a downwardly projecting flange 15 which surrounds the bulged portion 14ª and is designed to enter the mouth of the inner vessel to prevent loss of the contents thereof and to prevent any water or the like within the outer receptacle from finding its way into the inner vessel. A slot 16 is formed in one side of the cover 14 and the pinions 13 project upwardly through this slot. Journaled upon the exterior of the bulged portion of the cover 14 is a drive wheel 17 which meshes with one of the pinions 13 when the cover is in position and is provided with a finger-piece 18 by means of which it can be conveniently turned. It will thus be obvious that by placing the dashers in position within the inner vessel 2 and applying the cover 14 so that the drive wheel 17 meshes with one of the pinions 13, the two dashers may be rapidly rotated in opposite directions by grasping the finger-piece and turning the drive wheel. In this manner the contents of the inner vessel may be thoroughly agitated and the device will be found particularly useful for such operations as whipping cream and beating eggs. When the dashers are removed the inner vessel may be used either for cooking or culinary purposes. When employed in the former capacity the food to be cooked is placed within the inner vessel 2 and water within the outer receptacle. In a somewhat analogous manner when the device is used for cooling purposes the material to be cooled is placed within the inner vessel while ice or other cooling medium is placed within the outer receptacle so as to surround the inner vessel. A flat cover 19 is also provided for the inner vessel 2 and may be applied to the same either when it is supported within the outer receptacle or when it is removed therefrom.

The invention also contemplates the provision of a perforated shell 20 which may be placed within the outer receptacle 1 instead of the inner vessel 2 when it is desired to carry on certain operations such as frying crullers and the like. This perforated shell 20 is somewhat shallower than the outer receptacle 1 but corresponds to the shape thereof so that only a small amount of space remains between the two members when assembling. A rim 21 extends around the top of the perforated shell and is designed to rest upon the inward projections 4 of the outer receptacle when the shell is inserted in position therein. This perforated shell may be used as a colander and the perforations in the bottom thereof are punched outwardly so as to leave an outwardly projecting ragged edge 22 surrounding the bottom openings. These ragged edges 22 form a roughened surface which enables the bottom of the shell to be employed for grating potatoes or lemon rinds. It will thus be obvious that the inner vessel 2 and the perforated shell 20 may be used interchangeably in connection with the outer receptacle 1 and that by properly assembling the members the utensil may be employed for a large number of culinary operations. A cover 23 is also provided for the outer receptacle 1, the central portion of the cover having a slight upward bulge so that the cover will not interfere with the free circulation of steam from the outer receptacle to the inner vessel 2 when the latter is in position within the former. This device when employed in connection with the dashers will be found particularly useful for whipping canned cream which owing to the agitation produced by the dashers can be quickly reduced to a foamy condition.

Having thus described the invention, what is claimed as new is:

1. In a utensil of the character described, the combination of an outer receptacle, an inner receptacle supported within the outer receptacle and having a substantially semispherical formation, a cover for the outer receptacle, the said cover having a portion thereof bulged for coöperation with the inner vessel to provide a substantially spherical chamber, and a rotary dasher mounted within the chamber.

2. In a utensil of the character described, the combination of an outer receptacle, an inner vessel supported within the outer receptacle and provided upon one side with a bearing and upon the opposite side with a notch, a dasher mounted within the inner vessel and formed with a pivot stud operating within the bearing and a stub shaft received within the notch, a cover for the outer receptacle, and means upon the cover for rotating the dasher.

3. In a utensil of the character described, the combination of an outer receptacle, an inner vessel supported within the outer receptacle and provided upon one side with a bearing and upon the opposite side with a notch, a dasher mounted within the inner vessel and formed with a pivot stud operating within the bearing and a stub shaft received within the notch, a pinion upon the stub shaft, a cover for the outer receptacle, and a drive wheel upon the cover for engaging the pinion to actuate the dasher.

4. In a utensil of the character described, the combination of an outer receptacle, an inner vessel supported within the outer receptacle and provided upon one side with a pair of bearings and upon the opposite side with a pair of notches, a pair of dashers mounted within the inner vessel and provided with pivot studs received within the bearings and with stub shafts received within the notches, pinions applied to the stub shafts and meshing with each other, a cover for the outer receptacle, and a drive wheel mounted upon the cover and engaging one of the pinions for actuating the two dashers.

5. In a utensil of the character described, the combination of an outer receptacle, an inner vessel supported within the outer receptacle, the said inner vessel being provided upon one side with a pair of bearings and upon the opposite side with a pair of notches, a pair of ring dashers mounted within the inner vessel and provided with pivot studs received within the bearings and stub shafts received within the notches, pinions applied to the stub shafts and meshing with each other, a cover for the outer receptacle, the said cover being formed with a bulged portion which coöperates with the inner vessel to form a closed chamber, and a drive wheel mounted upon the cover and engaging one of the pinions for rotating the two dashers in opposite directions.

In testimony whereof I affix my signature in presence of two witnesses.

EUGENE C. PRICE. [L. S.]

Witnesses:
CLARENCE B. MITCHELL,
F. M. COLEMAN.